(12) United States Patent
Ionta et al.

(10) Patent No.: US 9,800,487 B2
(45) Date of Patent: Oct. 24, 2017

(54) MEASUREMENT ON A DATA FLOW IN A COMMUNICATION NETWORK

(75) Inventors: Tiziano Ionta, Rome (IT); Antonio Cappadona, Rome (IT)

(73) Assignee: TELECOM ITALIA S.p.A., Milan (IT)

( * ) Notice: Subject to any disclaimer, the term of this patent is extended or adjusted under 35 U.S.C. 154(b) by 277 days.

(21) Appl. No.: 14/345,090

(22) PCT Filed: Sep. 19, 2011

(86) PCT No.: PCT/EP2011/066236
§ 371 (c)(1),
(2), (4) Date: Mar. 14, 2014

(87) PCT Pub. No.: WO2013/041120
PCT Pub. Date: Mar. 28, 2013

(65) Prior Publication Data
US 2014/0369218 A1 Dec. 18, 2014

(51) Int. Cl.
*H04L 12/26* (2006.01)

(52) U.S. Cl.
CPC ........ *H04L 43/0894* (2013.01); *H04L 43/026* (2013.01); *H04L 43/062* (2013.01); *H04L 43/0835* (2013.01)

(58) Field of Classification Search
CPC . H04L 43/026; H04L 43/062; H04L 43/0835; H04L 43/0894
USPC ........................................................ 370/252
See application file for complete search history.

(56) References Cited

U.S. PATENT DOCUMENTS

| 8,531,987 B2 * | 9/2013 | Cociglio | H04L 43/106 370/252 |
| 8,910,006 B2 * | 12/2014 | Heise | H04L 1/1841 370/230 |
| 2002/0027884 A1 * | 3/2002 | Halme | H04L 12/24 370/400 |

(Continued)

FOREIGN PATENT DOCUMENTS

| EP | 2 242 236 A1 | 10/2010 |
| WO | WO 2010/072251 A1 | 7/2010 |
| WO | WO 2011/079857 A1 | 7/2011 |

OTHER PUBLICATIONS

International Search Report issued Nov. 14, 2011 in Application No. PCT/EP2011/066236.

*Primary Examiner* — Xavier Szewai Wong
(74) *Attorney, Agent, or Firm* — Oblon, McClelland, Maier & Neustadt, L.L.P.

(57) ABSTRACT

A method performing a measurement on a data flow at a node of a communication network, the data flow including data units transmitted during first and second block periods marked by respective first and second marking values, the first and second block periods alternating in time. The method includes, at the node, during a current block period: a) determining a first parameter relating to the data units received at the node during a preceding block period; b) receiving from a further node of the transmission path a first data structure including a second parameter relating to data units transmitted to the node during the preceding block period; c) processing the first parameter and the second parameter for providing a result of the measurement on the data flow; and d) transmitting to a still further node of the transmission path a second data structure including the first parameter.

16 Claims, 7 Drawing Sheets

(56) References Cited

U.S. PATENT DOCUMENTS

| | | | |
|---|---|---|---|
| 2004/0246903 A1* | 12/2004 | Huang | H04L 12/56 370/247 |
| 2008/0031146 A1 | 2/2008 | Kwak et al. | |
| 2008/0159287 A1 | 7/2008 | Nagarajan et al. | |
| 2009/0296602 A1* | 12/2009 | Bange | H04L 12/28 370/254 |
| 2010/0302949 A1 | 12/2010 | Fukagawa | |
| 2011/0255440 A1 | 10/2011 | Cociglio et al. | |
| 2012/0207085 A1* | 8/2012 | Guguen | H04B 7/022 370/324 |

* cited by examiner

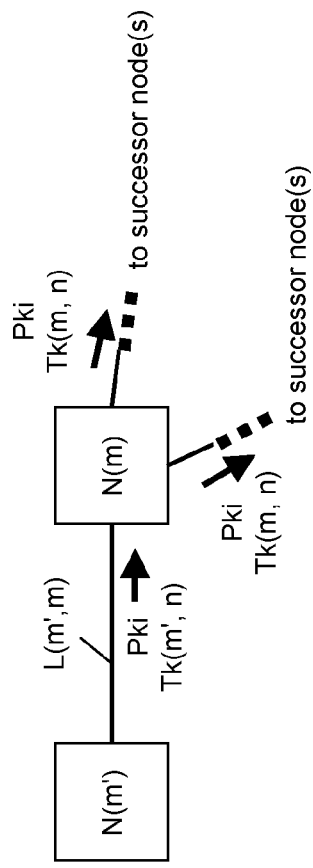
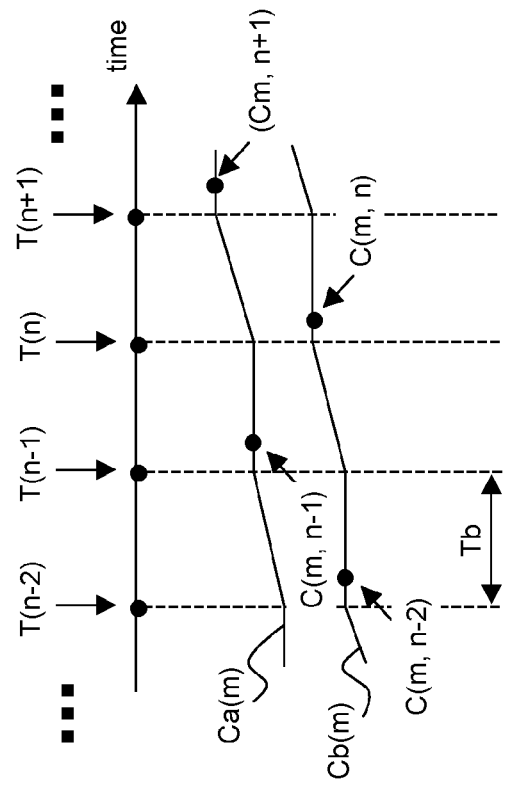
Figure 3
Figure 4

| F1 block period | F2 start time | F3 marking | F4 input interface | F5 packet count | F6 number of received packets | F7 successful Pkt measurement |
|---|---|---|---|---|---|---|
| n-2 | T(n-2) | Va | IF(m, n-2) | C(m, n-2) | Pkt(m, n-2) | ON/OFF |
| n-1 | T(n-1) | Vb | IF(m, n-1) | C(m, n-1) | Pkt(m, n-1) | ON/OFF |
| n | T(n) | Va | IF(m, n) | C(m, n) | Pkt(m, n) | ON/OFF |

| LB | Id-N(m) | Id-IF | Ts(m, n) | Id-F | Pkt(m, n) | B(m, n) | MRK | InfoDL(1) | ... | InfoDL(m') | InfoDL(m) | DBG |
|---|---|---|---|---|---|---|---|---|---|---|---|---|

MEASUREMENT ON A DATA FLOW IN A COMMUNICATION NETWORK

TECHNICAL FIELD

The present invention relates to the field of communication networks. In particular, the present invention relates to a method for performing a measurement, in particular a data loss measurement and/or a time measurement (in particular, a measurement of delay and/or interarrival jitter), on a data flow transmitted in a communication network. Further, the present invention relates to a node of a communication network implementing such a method.

BACKGROUND ART

In a packet-switched communication network, data are transmitted in the form of packets which are routed from a source node to a destination node through possible intermediate nodes. Exemplary packet-switched networks are Ethernet networks, IP networks and MPLS networks.

On the other hand, in circuit-switched networks data are transmitted in the form of continuous bit flows carried from the source node to the destination node within plesiochronous or synchronous frames. Exemplary circuit-switched networks are PDH, SDH, Sonet and OTN networks.

Herein after, the expression "data unit" will designate a data portion transmitted in a communication network. In particular, in case of a packet-switched network, a data unit may be a packet or a portion of a packet. Besides, in case of a circuit-switched network, a data unit may be a plesiochronous frame, a portion of a plesiochronous frame, a synchronous frame or a portion of a synchronous frame.

Data transmitted either in a packet-switched network or in a circuit-switched network from a source node not always reach the destination node, i.e. they may be lost during transmission through the network.

Loss of data may be due to different reasons. For instance, a node or a link may fail, thereby causing a total data loss until the failure is either bypassed or fixed. Alternatively, in a packet-switched network, data within a packet may be discarded by an intermediate node due to a congestion of its ports. Besides, both in packet-switched networks and in circuit-switched networks, data may be discarded by an intermediate node or by the destination node, since they contain bit errors.

When providing a service by transmitting data through a packet-switched network or a circuit-switched network, the rate of data lost during transmission affects the quality of service (QoS) of that service.

Besides, a data unit is transmitted at a transmission time by the source node and is received at a reception time by the destination node. The time elapsing between transmission time and reception time is typically called "one way delay" (or, briefly, "delay"). The delay of a data unit is given by the following equation:

$$D = Trx - Ttx, \quad [1]$$

where Ttx is the transmission time and Trx is the reception time of the data unit.

The delay of a data unit mainly depends on the number of possible intermediate nodes crossed by the data unit from source to destination, on the permanence time of the data unit at the source node and at each possible intermediate node (mainly within the buffers of such nodes) and on the propagation time along the links (which is turn depends on the length of the links and their capacity). In packet-switched networks, where data units are routed hop-by-hop by each node, both the number of possible intermediate nodes crossed by data units and the permanence time of data units at each node are unpredictable. Accordingly, the delay of a data unit is almost unpredictable.

Besides, data units of a same data flow may have different delays. In a packet-switched communication network, the difference in the delays of two data units (i.e. packets) of a same data flow is termed "interarrival jitter". In particular, if Ttx1 and Ttx2 are the transmission times for a first packet and a second packet, and Trx1 and Trx2 are the reception times for the first packet and the second packet, the interarrival jitter may be expressed as:

$$J = (Trx1 - Trx2) - (Ttx1 - Ttx2). \quad [2]$$

When a communication service (in particular, a real-time voice or data service such as calls, conference calls, video conferences, etc.) is provided by means of a communication network, the delay and interarrival jitter of the data flows carrying the service strongly affect the quality of service (QoS) perceived by the end users of the service.

Therefore, measuring the data loss and delay/interarrival jitter of the data flows carrying services is of particular interest for network operators.

WO 2010/072251 (in the name of the same Applicant) discloses a method for measuring data loss of a data flow transmitted through a communication network from a transmitting node to a receiving node. Before transmitting the data units of the data flow, the transmitting node marks each data unit for dividing the data flow in blocks. In particular, the transmitting node marks each data unit by setting a bit of its header to "1" or "0". The marking results in a sequence of blocks, where blocks of data units marked with "1" alternate in time with blocks of data units marked with "0". The blocks may have a same duration termed "block period" Tb (e.g. 5 minutes). Further, while marking the data units, the transmitting node increases by one a first counter C1 each time a data unit is marked by "1", and a second counter C0 each time a data unit is marked by "0". The marked data units are then received at the receiving node. Each time the receiver node receives a data unit, it checks its marking, increases a third counter C'1 if the marking is "1" and increases a fourth counter C'0 if the marking is "0".

According to WO 2010/072251, while the transmitting and receiving nodes are operating as described above, a management server cooperating with the transmitting and receiving nodes periodically detects the values of the counters C1, C0, C'1 and C'0, and uses them for calculating the data loss.

WO 2011/079857 (in the name of the same Applicant) discloses a method for performing a time measurement (in particular, measuring delay and/or interarrival jitter) on a data flow transmitted from a transmitting node to a receiving node of a communication network.

SUMMARY OF THE INVENTION

The Applicant has tackled the problem of providing a method for performing a measurement on data flow transmitted in a communication network, which may be implemented in a distributed way by the nodes themselves, without requiring the intervention of any external management server collecting measurements from the nodes, which is capable of automatically adapting to possible changes of the network topology and of the paths followed by the data flow across the communication network, and which eases the operations of performance monitoring and failure detection and management.

In the following description and in the claims, the expression "performing a measurement" will designate an operation of measuring data loss and/or an operation of performing a time measurement.

Further, in the following description and in the claims, the expression "measuring data loss" will designate an operation of measuring a difference between a number of data units detected at a first node and a number of data units detected at a second node, this difference corresponding to the number of data units lost in transmission from the first node to the second node.

Further, in the following description and in the claims, the expression "performing a time measurement" will designate an operation of measuring:
- a delay induced on a data unit by transmission from the first node to the second node; and/or
- an interarrival jitter induced on a pair of data units by transmission from the first node to the second node.

Besides, in the following description and in the claims, the expression "marking a data unit" will designate an operation of setting a feature of the data unit to a predefined marking value, in particular to one of at least two alternative marking values. For instance, the operation of marking a data unit may comprise the operation of setting one or more bits of the data unit (e.g. one bit or a bit sequence of its header) to one of at least two predefined alternative marking values, the operation of setting its frequency or its phase to one of at least two predefined alternative marking values, and so on.

Further, in the claims, the term "parameter" designates either a value of a counter counting the number of received or transmitted data units of the data flow marked by a given marking value, or a timestamp indicating the time at which a data unit of the data flow marked by a given marking value is received or transmitted.

According to a first aspect, the present invention provides a method for performing a measurement on a data flow at a node of a communication network, the data flow being transmitted along a transmission path comprising the node, the data flow comprising data units, data units transmitted during first block periods being marked by a first marking value and data units transmitted during second block periods being marked by a second marking value, the first block periods alternating in time with the second block periods, the method comprising, at the node, during a current block period:
a) determining a first parameter relating to the data units received at the node during a preceding block period;
b) receiving from a further node of the transmission path a first data structure comprising a second parameter relating to data units transmitted to the node during the preceding block period;
c) processing the first parameter and the second parameter for providing a result of the measurement on the data flow; and
d) transmitting to a still further node of the transmission path a second data structure comprising the first parameter.

Preferably, step d) further comprises inserting in the second data structure also the result of the measurement on the data flow.

According to preferred embodiments, the first data structure comprises also a further result of the measurement on the data flow as calculated by the further node. In such embodiments, step d) further comprises inserting in the second data structure also the further result of the measurement on the data flow as calculated by the further node.

Preferably, the first parameter indicates a first number of data units received at the node during the preceding block period, the second parameter indicates a second number of data units transmitted to the node during the preceding block period, and the result of the measurement on the data flow indicates a third number of data units lost in transmission from the further node to the node during the preceding block period.

Preferably, the method comprises, at the node, during the second block periods, increasing a first counter upon reception of each data unit marked by the second marking value, and step a) comprises determining the first parameter by processing the counter.

In particular, preferably, step a) comprises determining the first parameter as a difference between a first data unit count and a second data unit count, the first data unit count being equal to a first value reached by the first counter during the current block period and the second data unit count being equal to a second value reached by the first counter during a still preceding block period; and step c) comprises providing the result of the measurement on the data flow as a difference between the second parameter and the first parameter.

Profitably, step a) comprises:
checking whether the data flow is received at the node through a same input interface during the current block period and during the still preceding block period;
in the negative, determining that the first data unit count may not be determined;
in the affirmative, setting the first data unit count equal to the first value reached by the first counter during the current block period and checking whether the second data unit count is available;
in the affirmative, determining the first parameter as a difference between the first data unit count and the second data unit count; and
in the negative, determining that the first parameter may not be determined.

According to preferred embodiments, step b) comprises, at a query time comprised in the current block period, transmitting to the further node a request for receiving the first data structure.

Preferably, step b) comprises setting the query time equal to a preceding query time determined during the preceding block period delayed by a duration the block periods.

According to a particularly preferred variant, step b) comprises bringing backward the query time by a predefined offset.

Preferably, the method further comprises:
at step b), checking whether the first data structure is received from the further node (N(m')) in reply to the request;
in the negative, determining that the result of the measurement on the data flow not be provided;
in the affirmative, at step b), checking whether the first data structure comprises the second parameter relating to data units transmitted to the node during the preceding block period;
in the affirmative, using the first parameter for providing the result of the measurement on the data flow; and
in the negative, at step b), re-transmitting the request to the further node.

Preferably, the second data structure is stored at the node.

According to particularly preferred variants, a content of the second data structure is overwritten at each block period if a new second data structure is generated.

According to a second aspect, the present invention provides a node for a communication network, the node being configured for being comprised in a transmission path along which a data flow is transmitted through the communication network, the data flow comprising data units, data units transmitted during first block periods being marked by a first marking value and data units transmitted during second block periods being marked by a second marking value, the first block periods alternating in time with the second block periods, the node being configured to, during a current block period:
a) determine a first parameter relating to the data units received at the node during a preceding block period;
b) receive from a further node of the transmission path a first data structure comprising a second parameter relating to data units transmitted to the node during the preceding block period;
c) process the first parameter and the second parameter for providing a result of the measurement on the data flow; and
d) transmit to a still further node of the transmission path a second data structure comprising the first parameter.

According to a third aspect, the present invention provides a communication network comprising a node as set forth above.

According to a fourth aspect, the present invention provides a computer program product, loadable in a memory of at least one computer and including software code portions for performing the steps of the method as set forth above, when the product is run on a computer.

BRIEF DESCRIPTION OF THE DRAWINGS

The present invention will become clearer from the following detailed description, given by way of example and not of limitation, to be read with reference to the accompanying drawings, wherein:

FIG. 3 schematically shows a node, its predecessor node and the link connecting them;

FIG. 4 is a time diagram showing the evolution in time of the counters implemented by the node of FIG. 3;

FIG. 9 shows a table T stored at the node of FIG. 3; and

FIG. 10 schematically shows the structure of a token generated by the node of FIG. 3.

DETAILED DESCRIPTION OF PREFERRED EMBODIMENTS OF THE INVENTION

Herein after, the method according to an embodiment of the present invention will be described in detail, by referring to the particular exemplary case of measuring data loss in a packet-switched network.

Figure 1:
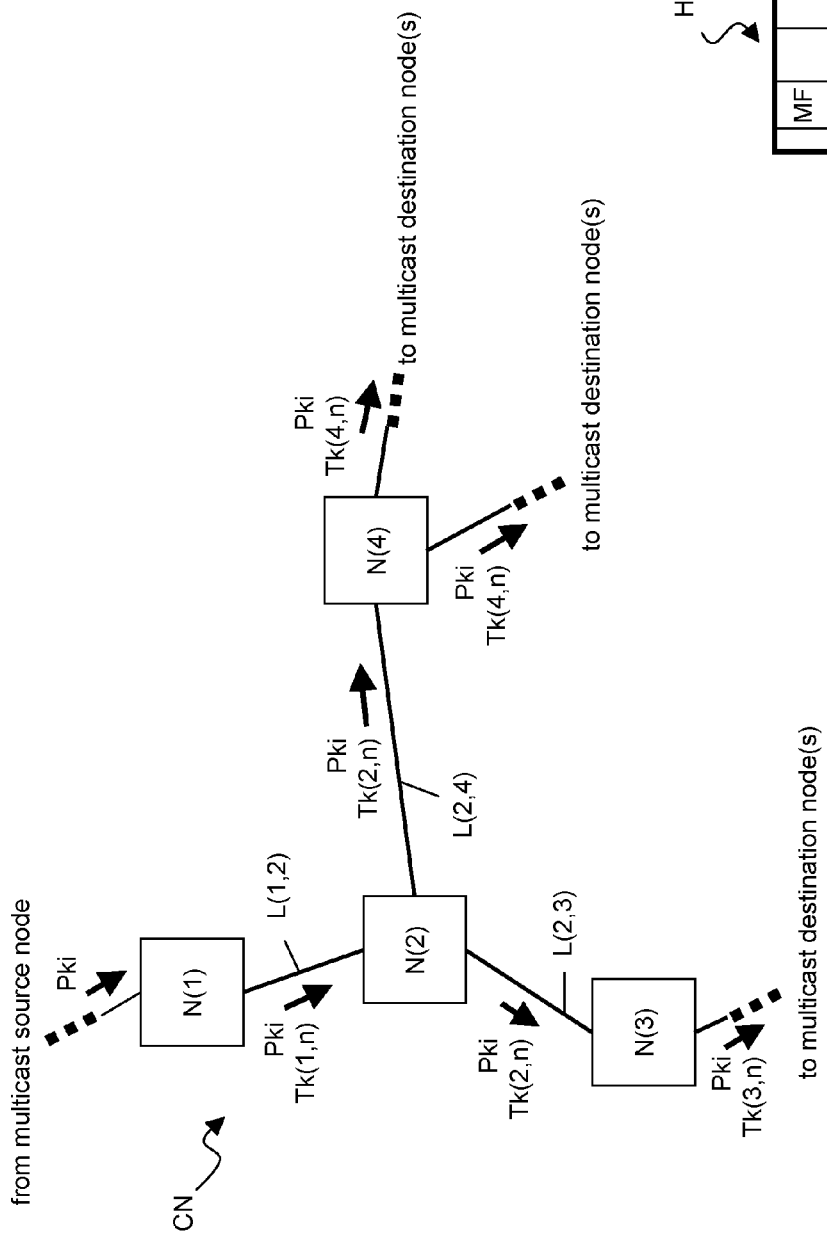
FIG. 1 schematically shows a portion of an exemplary packet-switched network.

FIG. 1 schematically shows an exemplary packet-switched communication network CN comprising a plurality of nodes. The communication network CN may be for instance an Ethernet network, an Internet network, or any other type of packet-switched communication network. In FIG. 1, for simplicity, only four nodes N(1), N(2), N(3), N(4) of the network CN are shown. The nodes N(1), N(2), N(3), N(4) are connected each other according to a tree topology. In particular, the nodes N(1), N(2) are connected by a link L(1, 2), the nodes N(2), N(3) are connected by a link L(2, 3) and the nodes N(2), N(4) are connected by a link L(2, 4). The topology of the communication network CN of FIG. 1 (and, in particular, of the portion of communication network CN comprising the nodes N(1), N(2), N(3), N(4)) is merely exemplary.

The nodes N(1), N(2), N(3), N(4) of the communication network CN are configured for supporting transmission of data traffic in the form of packets Pki. Herein after, it is assumed that the nodes N(1), N(2), N(3), N(4) are intermediate nodes of a multicast distribution tree, namely: the node N(1) receives packets Pki generated by a multicast source node, which are addressed to a number of destination nodes. The node N(1) transmits the packets Pki to the node(s) located immediately downstream along the multicast distribution tree, namely the node N(2). Similarly, the node N(2) forwards the packets Pki to the node(s) located immediately downstream along the multicast distribution tree, namely the nodes N(3) and N(4). Similarly, each node N(3), N(4) forwards the packets Pki to the node(s) located immediately downstream along the multicast distribution tree (which for simplicity are not shown in FIG. 1). The path followed by the packets Pki of the multicast transmission is schematically indicated by arrows in FIG. 1.

The multicast transmission scenario is merely exemplary. Indeed, the method of the present invention may be applied to various scenarios other than multicast transmission, for instance point-to-point transmission (e.g. MPLSE-TE tunnels, ATM/FR tunnels, etc.).

According to preferred embodiments of the present invention, the packets Pki are marked, i.e. they include a feature (namely, a field comprising at least one bit) whose value is set to one of two alternative marking values Va, Vb.

Figure 2:
FIG. 2 schematically shows a packet's structure, according to an embodiment of the present invention.

More particularly, as shown in FIG. 2, each packet Pki comprises a header Hi and a payload Pi. The payload Pi comprises data to be transmitted. Besides, preferably, the header Hi comprises information for routing the packet Pki, such as the source node address and the destination node address. The packet Pki further comprises a marking field MF, which may be set to one of two alternative marking values Va, Vb. The marking field MF is preferably comprised in the header Hi. The marking field MF may be for instance a field to which the protocol according to which the packet Pki is formatted has not assigned a specific function yet. Alternatively, the marking field MF may be a field having other uses. For instance, in case of IP packets, the marking field may be the 6-bit DSCP (Differentiated Services Code Point) field, and its two alternative marking values Va and Vb may be 25 and 27, respectively. Alternatively, the marking field MF may comprise a single bit, whose alternative marking values Va and Vb are 1 or 0, respectively.

The packets Pki are preferably marked by any node located upstream the node N(1) (preferably, by the multicast source node) which properly sets the value of the marking field MF to one of the two alternative marking values Va, Vb. The marking value Va, Vb assigned to the marking field MF (for instance, 25 or 27 in case of DSCP field of IP packets) is periodically changed with a period Tb, which will be termed herein after "block period". This way, packets Pki marked during first block periods are marked by a first marking value Va (e.g. 25), while packets Pki marked during second block periods which alternate in time with the first block periods are marked by a second marking value Vb (e.g. 27).

The block period Tb may be set by the network operator, according to the desired data loss measurement rate (as it will be described in detail herein after, the block period Tb is also the measurement period). For instance, the block period Tb may be equal to 5 minutes.

In general, as shown in FIG. 3, an intermediate node N(m) of the multicast distribution tree receives the packets Pk from a single node N(m') located upstream, which will be termed herein after also "predecessor node". The intermediate node N(m) may be anyone of the nodes N(1), N(2), N(3), N(4) of FIG. 1. The predecessor node N(m') may be either the source node of the packets Pki or an intermediate node of the path followed by the packets Pki. The predecessor node N(m') may be located immediately upstream the intermediate node N(m). In such case, the intermediate node N(m) is connected to the predecessor node N(m') by a link L(m', m), as shown in FIG. 3. Alternatively, the intermediate node N(m) may be connected to the predecessor node N(m') by further intermediate nodes. Further, the intermediate node N(m) forwards the packets Pki to one or more nodes located downstream, which will be termed herein after also "successor node(s)" (not shown in FIG. 3). Each successor node may be located immediately downstream the intermediate node N(m). In such case, the intermediate node N(m) is connected to the successor node by a respective link. Alternatively, the intermediate node N(m) may be connected to each successor node by further intermediate nodes.

Herein after, the operation of the intermediate node N(m) will be described in detail.

The node N(m) preferably implements a couple of counters Ca(m), Cb(m). Upon reception of each packet Pki from the predecessor node N(m'), the node N(m) preferably checks the value of the marking field MF of the packet Pki. If the marking field MF is set to the first marking value Va, the node N(m) preferably increases the first counter Ca(m). If the marking field MF is set to the second marking value Vb, the node N(m) preferably increases the second counter Cb(m). Hence, during each block period, one of the counters Ca(m) or Cb(m) increases while the other one has fixed value. This is schematically shown in the time diagram of FIG. 4, showing four consecutive block periods starting at times T(n−2), T(n−1), T(n), T(n+1). The start times T(n−2), T(n−1), T(n), T(n+1) are equally spaced in time by Tb. The block period starting at time T(n) will be termed herein after also "current block period" or "block period n", the block period starting at time T(n−1) will be termed herein after also "previous block period" or "block period n−1", the block period starting at time T(n−2) will be termed herein after also "still previous block period" or "block period n−2" and the block period starting at time T(n+1) will be termed herein after also "successive block period" or "block period n+1".

At the block periods n−2 and n, the packets Pki are marked by the first marking value Va, and accordingly at the node N(m) the first counter Ca(m) increases while the second counter Cb(m) has constant value. Besides, at the block periods n−1 and n+1, the packets Pki are marked by the second marking value Vb, and accordingly at the node N(m) the second counter Cb(m) increases while the first counter Ca(m) has constant value.

Preferably, at each block period, the node N(m) processes the counters Ca(m), Cb(m) for providing a packet count. In particular, at each block period, the packet count is set to the current value of the counter Ca(m), Cb(m) which is currently constant. Hence, at the block periods n−2 and n, the packet counts C(m, n−2), C(m, n) are set to the currently fixed value of the second counter Cb(m). Besides, at the block periods n−1 and n+1, the packet counts C(m, n−1), C(m, n+1) are set to the currently fixed value of the first counter Ca(m).

At each block period, for determining which one of the counters Ca(m), Cb(m) is having a fixed value, the node N(m) may for instance sample at least twice both counters Ca(m), Cb(m). If all the samples of a counter have a same value, the node N(m) determines that that counter is currently having fixed value. Alternative, the node N(m) may know in advance which marking is applied to the packets Pki during each block period. This allows the node N(m) knowing in advance which one of the two counters Ca(m), Cb(m) is currently having a fixed value, without the need of carrying out any multiple sampling of the counters (a single sampling per block period is sufficient).

At each block period, the node N(m) may then calculate the number of received packets. In particular, during the current block period n the node N(m) may calculate the number of received packets Pkt(m, n) as:

$$Pkt(m,n)=C(m,n)-C(m,n-2). \quad [3]$$

The number of packets Pkt(m, n) calculated at the current block period n according to equation [3] actually is the number of packets Pki received at the node N(m) during the previous block period n−1.

If, at the current block period n, the node N(m) may learn the number of packets Pkt(m', n) received by the predecessor node N(m') (or transmitted by the predecessor N(m'), in case the predecessor N(m') is the multicast source node), the node N(m) may also calculate the data loss DL(m', m, n) between the predecessor node N(m') and the node N(m) (namely, over the link L(m', m), if the predecessor node N(m') is located immediately upstream the node N(m)) as:

$$DL(m',m,n)=Pkt(m',n)-Pkt(m,n). \quad [4]$$

The data loss DL(m', m, n) is the number of packets Pki lost in transmission between the predecessor node N(m') and the node N(m). The data loss DL(m', m, n) calculated at the current block period n according to equation [4] actually is the number of packets Pki lost between the predecessor node N(m') and the node N(m) during the previous block period n−1.

It is now assumed that the operation of the nodes N(1), N(2), N(3), N(4) of FIG. 1 is similar to the operation of the node N(m) as described above.

Under this assumption, the node N(1) receives the marked packets Pki from the multicast source node (possibly through one or more intermediate nodes), implements a couple of counters Ca(1), Cb(1) which it increases upon reception of the packets Pki and derives therefrom the packet counts C(1, n−2), C(1, n−1), C(1, n), C(1, n+1) as described above. In turn, the node N(2) receives the marked packets Pki from the node N(1), implements a couple of counters Ca(2), Cb(2) which it increases upon reception of the packets Pki and derives therefrom the packet counts C(2, n−2), C(2, n−1), C(2, n), C(2, n+1) as described above. In turn, the node N(3) receives the marked packets Pki from the node N(2), implements a couple of counters Ca(3), Cb(3) which it increases upon reception of the packets Pki and derives therefrom the packet counts C(3, n−2), C(3, n−1), C(3, n), C(3, n+1) as described above. Similarly, the node N(4) receives the marked packets Pki from the node N(2), implements a couple of counters Ca(4), Cb(4) which it increases upon reception of the packets Pki and derives therefrom the packet counts C(4, n−2), C(4, n−1), C(4, n), C(4, n+1) as described above.

At the current block period n, each node N(1), N(2), N(3), N(4) preferably calculates the number of received packets Pkt(1, n), Pkt(2, n), Pkt(3, n), Pkt(4, n) applying the above equation [3] to the respective packet counts derived at the present block period n and at the still previous block period n−2.

Assuming that the node N(1) is the first node of the path followed by the packets Pki which operates similarly to the node N(m) of FIG. 3, the node N(1) may not learn the number of packets received or transmitted by its predecessor node, because its predecessor node does not perform such calculation. Hence, the node N(1) may not calculate the data loss over the link connecting it to the predecessor node by applying equation [4]. Then, at the current block period n, the node N(1) preferably generates a data structure (which will be termed herein after also "token") Tk(1, n) which comprises:

Pkt(1, n) as calculated by the node N(1), and makes the token Tk(1, n) available to its successor node, namely N(2).

In turn, at the current block period n, the node N(2) preferably retrieves the token Tk(1, n) from the node N(1), reads the value Pkt(1, n) comprised therein and calculates the data loss DL(1, 2, n) over the link L(1, 2) according to the above equation [4], namely DL(1, 2, n)=Pkt(1, n)−Pkt(2, n). Then, the node N(2) preferably generates a token Tk(2, n) which comprises:

Pkt(2, n) as calculated by the node N(2); and

DL(1, 2, n) as calculated by the node N(2), and makes the token Tk(2, n) available to its successor nodes, namely N(3) and N(4).

In turn, at the current block period n, the node N(3) retrieves the token Tk(2, n) from the node N(2), reads the value Pkt(2, n) comprised therein and calculates the data loss DL(2, 3, n) over the link L(2, 3) according to the above equation [4], namely DL(2, 3, n)=Pkt(2, n)−Pkt(3, n). Then, the node N(3) preferably generates a token Tk(3, n) which comprises:

Pkt(3, n) as calculated by the node N(3);

DL(1, 2, n) as read from the token Tk(2, n); and

DL(2, 3, n) as calculated by the node N(3), and makes the token Tk(3, n) available to its successor node(s) (not shown in FIG. 1).

Similarly, at the current block period n, the node N(4) retrieves the token Tk(2, n) from the node N(2), reads the value Pkt(2, n) comprised therein and calculates the data loss DL(2, 4, n) over the link L(2, 4) according to the above equation [4], namely DL(2, 4, n)=Pkt(2, n)−Pkt(4, n). Then, the node N(4) preferably generates a token Tk(4, n) which comprises:

Pkt(4, n) as calculated by the node N(4);

DL(1, 2, n) as read from the token Tk(2, n); and

DL(2, 4, n) as calculated by the node N(4), and makes the token Tk(4, n) available to its successor node(s) (not shown in FIG. 1).

Hence, at each block period the nodes N(1), N(2), N(3), N(4) generate a flow of tokens which follows substantially the same path as the packets Pki, as shown in FIG. 1.

Each node uses the information comprised in the token received from its predecessor node for calculating the data loss on the link connecting it to its predecessor node. Each node is then capable of autonomously performing the calculation of the data loss over the link connecting it to its predecessor node, because it is capable to learn from the predecessor node the information needed to apply equation [4]. Hence, no centralized manager responsible to collect the information from the various nodes and to perform the data loss calculations relating to the various links of the path is needed. The data loss calculation is decentralized at the nodes themselves, which are able to exchange the information needed through a changeover of tokens.

Avoiding a centralized manager advantageously reduces the costs of implementation of the data loss measurement in the communication network CN. Indeed, the exchange of information between adjacent nodes which implements the above described token changeover mechanism is less demanding in terms of bandwidth occupation than an exchange of information between a centralized manager and nodes of the path, which would be needed in case of centralized calculation.

Further, the decentralized data loss calculation at the nodes of the communication network is more flexible than a centralized implementation, because it is capable of automatically adapting to possible changes of the topology of the communication network CN (addition/removal of nodes) and/or to possible changes of the path followed by the packets Pki (e.g. due to failures). Indeed, while an algorithm executed by a centralized manager for calculating the data loss should be manually reconfigured in case of a topology change or path change, no reconfiguration is needed at the nodes in such situations. Indeed, according to the algorithm executed by the nodes, each node identifies its predecessor node at each block period, as it will be described in further detail herein after. In case of a topology change or path change, the identified predecessor node changes and accordingly the calculation performed by the node will be based on information comprised in the token retrieved from the new identified predecessor node. This way, the data loss calculation performed at the node automatically adapts to topology/path changes.

In addition, the above described token changeover mechanism also advantageously eases the performance monitoring operations and failure detection and management operations in the communication network CN.

Indeed, each node involved in the token changeover mechanism receives from its predecessor node a token which comprises, in addition to the information needed for the data loss calculation, also the data loss relating to the links which connect the predecessor node to the first node which implements the token changeover mechanism. Hence, each node learns (and stores) not only the data loss relating to the link connecting it to its predecessor node (which it calculated using the information comprised in the token retrieved from the predecessor node), but also the data losses calculated by the nodes located upstream along the path followed by the packets Pki (included the predecessor node). Hence, by reading the information stored at a single node of the path, a network operator may have a very quick overview of the performance of all the links which form the path followed by the packets Pki from the first node implementing the above token changeover mechanism to the examined node. Possible performance degradation on different links of the path may accordingly be easily and quickly localized with a single query to a single node of the path.

According to first embodiments, the token changeover mechanism between nodes is a forward mechanism according to which, at each block period, each node "pushes" the token which it generated to the successor node(s) as soon as the token is ready.

Alternatively, the token changeover mechanism may be a backward mechanism according to which, at each block period, each node "pulls" the token from the predecessor node by sending it a token request, as it will be described in detail herein after. This latter mechanism is preferred in scenarios where each node has a single predecessor node and multiple successor node(s), because it is simpler from the point of view of communication between nodes. Indeed, each node has to communicate with a single node, namely its predecessor node. Besides, the backward mechanism does not require any token reception acknowledgement, which is instead needed in case of forward mechanism (a node shall make certain that its successor node(s) properly received the token).

Further, according to still further embodiments not shown in the drawings, the flow of tokens may follow the same path as the packets Pki, in a direction opposite to that of the packets Pki. According to such embodiments, the intermediate node N(m) receives a token from one of its successor nodes, generates its own token using information comprised in the token received from the successor node and makes the token available to the predecessor node N(m'). The token generated by the intermediate node N(m) may be either "pushed" by the intermediate node N(m) or "pulled" by the predecessor node N(m'), as described above. In case the intermediate node N(m) has multiple successor nodes, the token generated by the node N(m) preferably comprises information relating to all the links connecting the node N(m) to the successor nodes. Such embodiment is however preferably applied to cases of point-to-point transmission, where each intermediate node has a single successor node.

In the above description, it has been assumed that each node N(1), N(2), N(3), N(4) counts the received packets Pki, namely the counters associated to the marking values Va, Vb are implemented at the input interface through which the packets Pki are received at the node. The data loss calculated based on such packet count therefore is actually indicative of the number of packets lost in transmission between the input interface of the predecessor node and the input interface of the node performing the calculation. The calculated data loss therefore actually takes into account both the data loss occurring on the link between the two nodes and the data loss occurring at the predecessor node between the input interface and the output interface of the packets Pki.

According to other variants, each node N(1), N(2), N(3), N(4) may count the transmitted packets, namely the counters associated to the marking values Va, Vb may be implemented at the output interface through which the packets Pki are transmitted by the node. The data loss calculated based on such packet count is therefore indicative of the number of packets lost in transmission between the output interface of the predecessor node and the output interface at the node performing the calculation. The calculated data loss therefore actually takes into account both the data loss occurring on the link between the two nodes and the data loss occurring at the node between the input interface and the output interface of the packets Pki.

According to other variants, each node N(1), N(2), N(3), N(4) may count both the received packets and the transmitted packets by implementing a first couple of counters at the input interface of the packets Pki and a second couple of counters at the output interface of the packets Pki. This would allow the node to separately calculate the number of packets lost in transmission over the link connecting it to the predecessor node (namely, between the output interface of the predecessor node and the input interface of the node performing the calculation) and the number of packets lost in transmission within the node performing the calculation (namely, between its input interface and its output interface).

Herein after, the operation of the node N(m) will be described in further detail.

Figure 5:
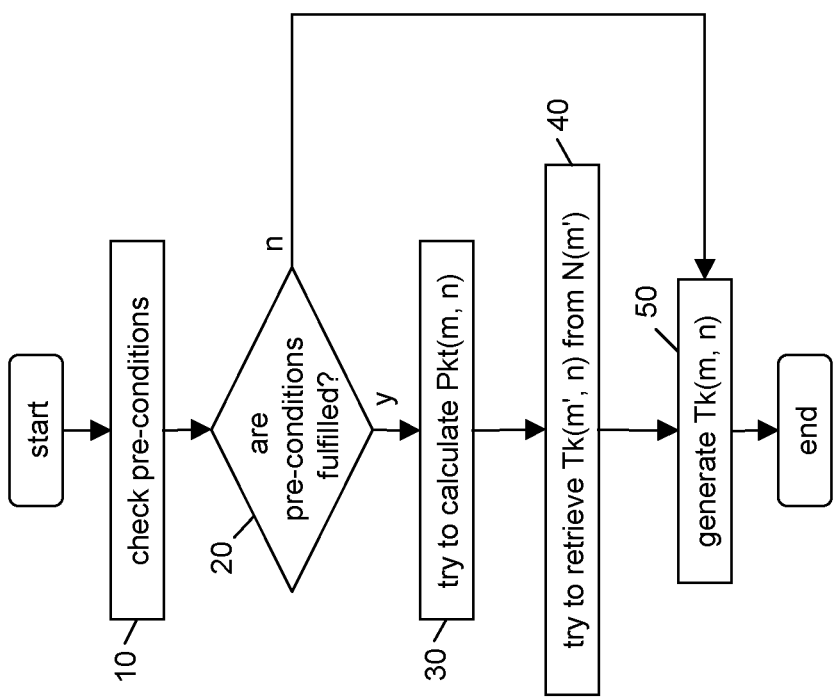
FIG. 5 is a flow chart of the operation of the node of FIG. 3.

With reference first to the flow chart of FIG. 5, when the node N(m) receives a command for activating a data loss measurement session over the flow of packets Pki, at each block period the node N(m) preferably performs steps 10-50 shown in FIG. 5. The duration Tb of the block periods may be specified in the received command.

In particular, at the current block period n, the node N(m) preferably checks whether a number of pre-conditions are fulfilled (step 20). In particular, at step 20 the node N(m) preferably checks whether the flow of packets Pki to be measured is currently flowing through the node N(m). Further, at step 20 the node N(m) preferably checks whether the input interface through which the packets Pki are received from the predecessor node N(m') may be identified. Further, at step 20 the node N(m) preferably checks whether the input interface through which the packets Pki are received is in "up state" (namely, whether the input interface is switched on and whether the above described counter mechanism is active at the input interface). Further, at step 20 the node N(m) preferably checks whether the predecessor node N(m') from which it is receiving the packets Pki is reachable.

If all the pre-conditions checked at step 20 are fulfilled, at the current block period n the node N(m) preferably tries to calculate the number of packets Pkt(m, n) received during the previous block period n−1, substantially by applying the above described calculation procedure (step 30).

More particularly, the node N(m) preferably stores a table T which is shown in FIG. 9. The table T comprises a number of rows, each row corresponding to a respective block period. The number of rows is preferably equal to 3, each row corresponding to the current block period n, the previous block period n−1 and the still previous block period n−2. At each block period, the content of each row of the table T is refreshed according to a sliding windows mechanism, so that the table T always stores the information relating to the current block period n, the previous block period n−1 and the still previous block period n−2. The information relating to still preceding block periods are not stored at the node N(m), because they are not needed for calculating the number of received packets Pkt(m, n) during the current block period n.

Each row of the table T preferably comprises at least one or the following fields.

A first field F1 preferably comprises an identifier of the block period, namely n−2, n−1 and n.

A second field F2 preferably comprises the block period start time, namely T(n−2), T(n−1) and T(n).

A third field F3 preferably comprises the marking value Va, Vb applied to the packets Pki during the block period.

A fourth field F4 preferably comprises an identifier of the input interface through which the packets Pki are received at the node N(m) during the block period, namely IF(m, n−2), IF(m, n−1) and IF(m, n).

A fifth field F5 preferably comprises the packet count determined by the node N(m) at the block period, namely C(m, n−2), C(m, n−1) and C(m, n).

A sixth field F6 preferably comprises the number of received packets Pki as calculated by the node N(m) during the block period, namely Pkt(m, n−2), Pkt(m, n−1) and Pkt(m, n). The numbers of received packets are preferably calculated by applying the above equation [3] to the values of the packet counts stored in the fifth field F5. In particular, the number of packet Pkt(m, n) calculated during the current block period n is calculated applying equation [3] to the values of the packet counts C(m, n−2) and C(m, n) stored in the fifth field F5 of the first and last rows of table T, respectively.

A seventh field F7 preferably comprises an indication of the outcome of the number of received packets calculation. In particular, the seventh field F7 is set to a first value (for instance, "ON" or "YES") if the node N(m) succeeded to calculate the number of received packets at the block period, whereas it is set to a second value (for instance, "OFF" or "NO") if the node N(m) did not succeed to calculate the number of received packets at the block period.

Figure 6:
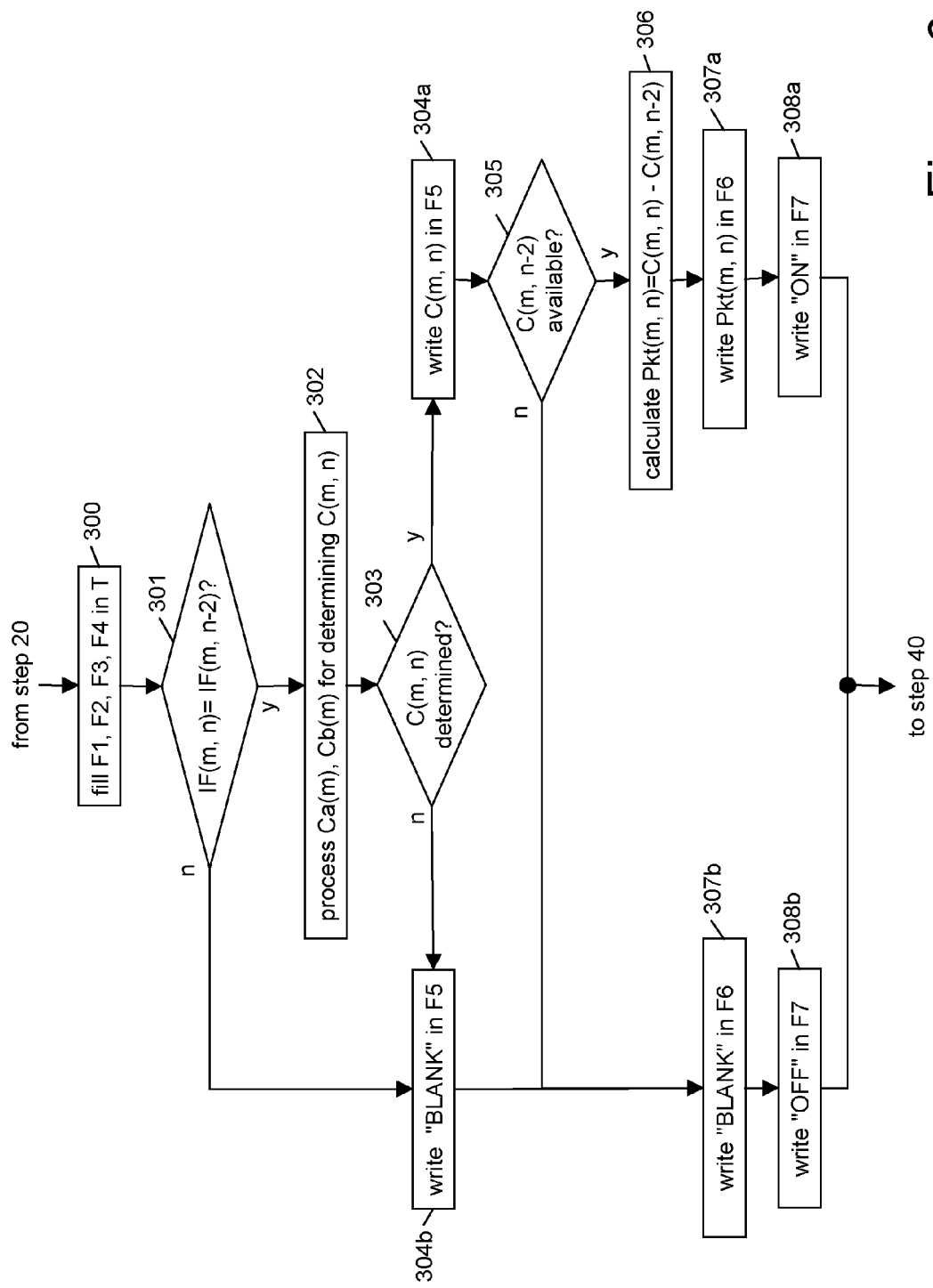
FIG. 6 is a more detailed flow chart of a step carried out by the node of FIG. 3.

By referring now to FIG. 6, which shows in further detail step 30, at sub-step 300 the node N(m) preferably fills the fields F1, F2, F3, F4 of the row relating to the current block period n in table T, by writing in such fields the identifier of the current block period n, the start time of the current block period T(n), the marking value Va or Vb applied at the previous block period n−1 and the identifier of the input interface IF(m, n) through which the packets Pki are received at the current block period n, respectively.

Then, at sub-step 301 the node N(m) preferably checks whether the input interface through which the packets Pki are received during the current block period n is the same as the input interface through which the packets were received during the still previous block period n−2. To this purpose, the node N(m) preferably reads in table T the identifier IF(m, n) stored in the fourth field F4 of the row relating to the current block period n and the identifier IF(m, n−2) stored in the fourth field F4 of the row relating to the still previous block period n−2, and compares them. If IF(m, n)=IF(m, n−2), the node N(m) determines that the packets Pki are received through the same input interface at the block periods n and n−2.

If, at sub-step 301, the node N(m) determines that the packets Pki are received through the same input interface at the block periods n and n−2, at sub-step 302 the node N(m) processes the counters Ca(m), Cb(m) as described above for deriving the packet count C(m, n) at the current block period n, as described above.

Then, if the node N(m) was able to determine the packet count C(m, n) (sub-step 303), at sub-step 304a the node N(m) preferably writes the determined packet count C(m, n) in the fifth field F5 of the row relating to the current block period n in table T. Then, at sub-step 305 the node N(m) preferably checks in table T whether the packet count C(m, n−2) at the still previous block period n−2 is available. To this purpose, the node N(m) preferably checks whether the fifth field F5 of the row relating to the still previous block period n−2 comprises a valid value.

In the affirmative, at sub-step 306 the node N(m) preferably calculates the number of received packets Pkt(m, n) by applying the above equation [4], namely: Pkt(m, n)=C(m, n)−C(m, n−2). Then, at sub-step 307a the node N(m) preferably writes the calculated number of packets Pkt(m, n) in the sixth field F6 of the row relating to the current block period n in table T. Then, at sub-step 308a the node N(m) preferably writes the value "ON" in the seventh field F7 of the row relating to the current block period n in table T.

If, at sub-step 305, the node N(m) determines that the packet count C(m, n−2) at the still previous block period n−2 is not available (namely, the fifth field F5 of the row relating to the still previous block period n−2 comprises a non valid value), it determines that the number of received packets Pkt(m, n) may not be calculated at the current block period n. Accordingly, at sub-step 307b the node N(m) preferably writes a predefined value (for instance, "BLANK" or "NULL") in the sixth field F6 of the row relating to the current block period n in table T. Further, at sub-step 308b the node N(m) preferably writes the value "OFF" in the seventh field F7 of the row relating to the current block period n in table T.

If, at sub-step 303, the node N(m) determines that it is not able to determine the packet count C(m, n) at the current block period n, at sub-step 304b the node N(m) preferably writes a predefined non valid value (for instance, "BLANK" or "NULL") in the fifth field F5 of the row relating to the current block period n in table T. Then, the node N(m) performs the above described steps 307b and 308b. Indeed, in such case the node N(m) is not able to calculate the number of received packets Pkt(m, n) at the current block period n.

If, at sub-step 301, the node N(m) determines that the packets Pki are received through different input interfaces at the block periods n and n−2, the node N(m) determines that the packet count C(m, n) at the current block period may not be compared with the packet count C(m, n−2) at the still previous block period n−2, because they are derived from counters implemented at different input interfaces, and hence they relate to packets Pki transmitted to the node N(m) from different predecessor nodes through different links. Hence, the node N(m) avoids the determination of the packet count C(m, n) at the current block period n, because is would be useless. The node N(m) then fills the fields F5, F6 and F7 of the row relating to the current block period n according to sub-steps 304b, 307b and 308b.

By referring again to FIG. 5, after trying to calculate the number of received packets Pkt(m, n), at the current block period n the node N(m) preferably tries to retrieve from the predecessor node N(m') the token Tk(m', n) generated by the predecessor node N(m') at the current block period n (step 40), namely it implements the backward token changeover mechanism mentioned above.

Figure 7:
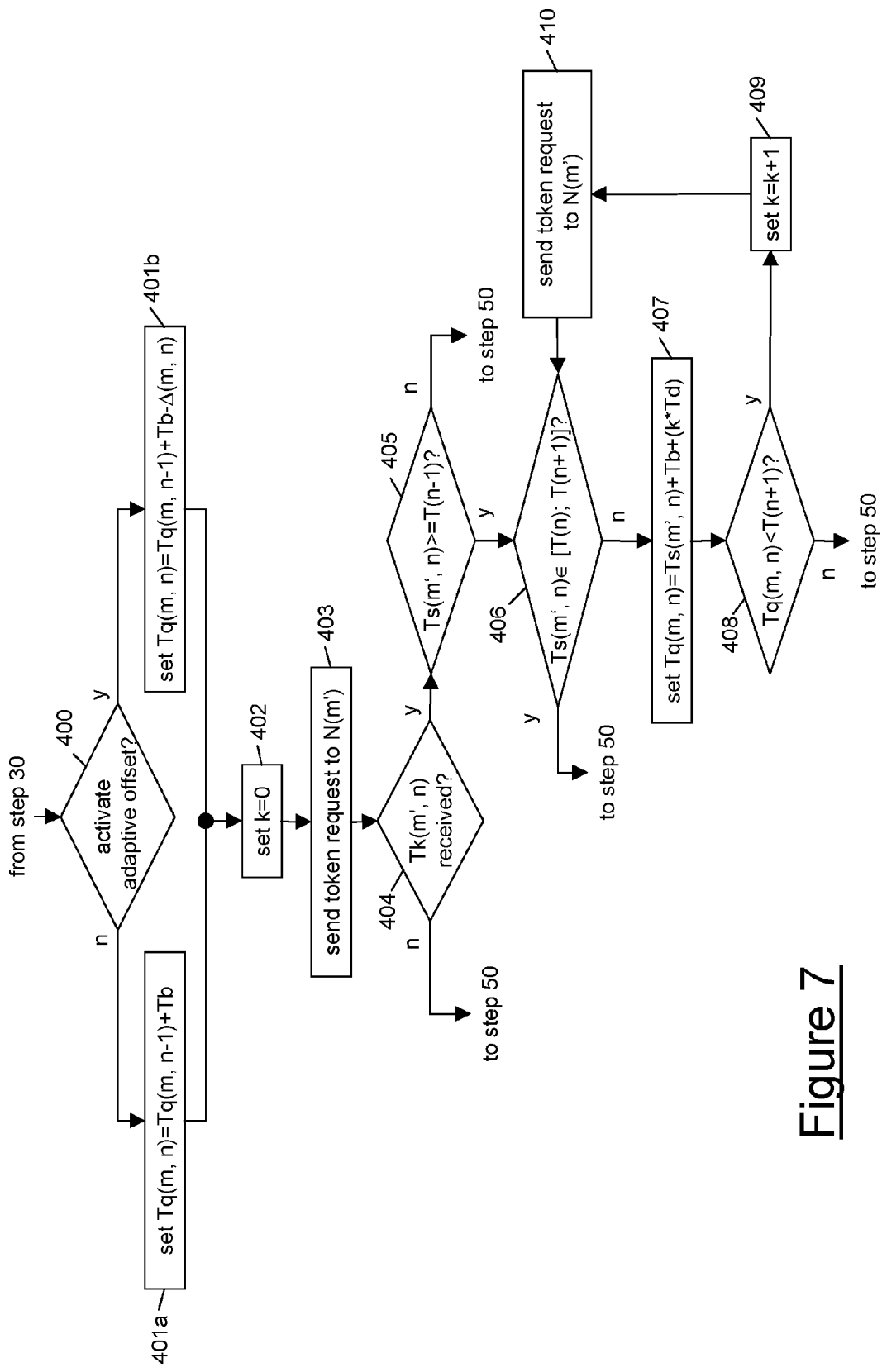
FIG. 7 is a more detailed flow chart of a further step carried out by the node of FIG. 3.

FIG. 7 shows in further detail step 40.

For trying to retrieve the token Tk(m', n) from the predecessor node N(m'), the node N(m) preferably periodically sends a token request to the predecessor node N(m').

To this purpose, the node N(m) first of all preferably determines a query time Tq(m, n) at which it shall start requesting the token Tk(m', n), namely the time at which a first token request shall be sent to the predecessor node N(m'). The query time Tq(m, n) within the current block period n is preferably set equal to the value at which the query time Tq(m, n−1) was set at the end of the previous iteration of step 40 (namely, the iteration of step 40 at the previous block period n−1) increased by the duration of the block period Tb, namely:

$$Tq(m,n)=Tq(m,n-1)+Tb. \qquad [5]$$

Such determination of the query time Tq(m, n) may however lead to an undesired drift of the query time Tq(m, n) towards the end of the block period. Indeed, the delay between the block period start time and the value at which the query time is set at the end of step 40 may increase at each block period. This increase may induce the query time Tq(m, n) to gradually shift towards the end of the block period and even to exceed the end of the block period. This would lead to an undesired result of missing the token Tk(m', n) generated at the current block period n.

For avoiding the undesired drift of the query time Tq(m, n), the node N(m) may optionally implement an adaptive offset technique, according to which at each block period the drift is pre-compensated by subtracting a predefined offset $\Delta(m, n)$ from the query time, namely:

$$Tq(m,n)=Tq(m,n-1)+Tb-\Delta(m,n). \quad [6]$$

The offset $\Delta(m, n)$ is preferably set by the network operator during the initialization phase, taking into account e.g. the network topology, the depth of the multicast distribution tree, the trade-off between minimization of the number of token requests sent to the predecessor node N(m') and minimization of the delay between the time at which the token Tk(m', n) is made available by the predecessor node N(m') and the time at which the token Tk(m', n) is retrieved by the node N(m), and so on. For instance, $\Delta(m, n)$ may be a periodic function whereby $\Delta(m, n)=0$ in a predefined number of consecutive block periods and $\Delta(m, n)>0$ in a single block period following the predefined number of consecutive block periods.

Hence, at step 40 the node N(m) first of all determines whether the adaptive offset is active (sub-step 400). In the negative, the node N(m) preferably determines the query time Tq(m, n) according to the above equation [5] (sub-step 401a). Otherwise, the node N(m) preferably determines the query time Tq(n, m) according to the above equation [6] (sub-step 401b).

Then, the node N(m) preferably sets an index k equal to an initial value, namely 0 (sub-step 402) and, at the query time Tq(m, n) determined at sub-step 401a or 401b, sends a token request to the predecessor node N(m') (sub-step 403).

If, in response to the token request, the node N(m) receives the token Tk(m', n) from the predecessor node N(m') (sub-step 404), at sub-step 405 the node N(m) preferably reads therefrom a timestamp Ts(m', n) (which the predecessor node N(m') inserted in the token Tk(m', n) upon its generation and which indicates the time at which the token T(m', n) was generated) and checks whether the timestamp Ts(m', n) coincide with or is delayed relative to the start time T(n−1) of the previous block period n−1. This allows the node N(m) to determine whether the token Tk(m', n) was generated at the current block period n or the previous block period n−1, or it was generated at an earlier block period.

If the node N(m) determines that the token Tk(m', n) was generated at an earlier block period, the node N(m) determines that the token mechanism was not active at the predecessor node N(m') for at least part of the previous block period n−1, and possibly for a number of block periods preceding the previous block period n−1. The node N(m) then concludes that the predecessor node N(m') is likely unable to generate the token Tk(m', n) at the current block period n. The node N(m) then abandons the attempt to retrieve the token Tk(m', n) from the predecessor node N(m') and continues its operation at step 50, as it will be described in detail herein after.

Otherwise, if the node N(m) determines that the token Tk(m', n) was generated at the current block period n or the previous block period n−1, at sub-step 406 the node N(m) determines whether the timestamp Ts(m', n) read from the token Tk(m', n) is comprised in the current block period n. This allows the node N(m) to determine whether the token Tk(m', n) was generated during the current block period n or the previous block period n−1.

In the affirmative, the node N(m) determines that the token Tk(m', n) was generated during the current block period n, and that accordingly the content of the retrieved token Tk(m', n) comprises information relating to the current block period n, which may be properly used for calculating the data loss over the link L(m', m), as it will be described in detail herein after.

In the negative, the node N(m) determines that the token Tk(m', n) was generated during the previous block period n−1, and that accordingly the content of the retrieved token Tk(m', n) comprises information relating to the previous block period n−1, which may not be properly used for calculating the data loss over the link L(m', m) at the current block period n. Hence, in this case the node N(m) preferably continues requesting the token Tk(m', n) to the predecessor node N(m') until it realizes that the token Tk(m', n) comprises information relating to the current block period n.

In particular, the node N(m) periodically requests the token Tk(m', n) to the predecessor node N(m') with a predetermined request iteration period Td, starting from a delayed query time Tq(m, n) which is based on the timestamp Ts(m', n) read from the token Tk(m', n) at sub-step 405. More in particular, at sub-step 407 the node N(m) preferably sets the query time Tq(m, n) equal to the timestamp Ts(m', n) increased by the duration of a block period Tb and by a predetermined amount k*Td. k is the above mentioned index which, at the first iteration of sub-step 407, is equal to its initial value, namely 0 (see sub-step 402). At sub-step 408 the node N(m) then checks whether the new query time Tq(m, n) calculated at sub-step 407 is earlier than the start time of the subsequent block period T(n+1).

In the affirmative, the node N(m) determines that the query time Tq(m, n) determined at sub-step 407 is still comprised within the current block period n. Accordingly, the node N(m) preferably increases the index k by one (sub-step 409). Then, at the query time Tq(m, n) determined at sub-step 407, the node N(m) sends a second token request to the predecessor node N(m') (sub-step 410). In response to the second token request, the node N(m) certainly receives the token Tk(m', n) from the predecessor node N(m'), because the predecessor node N(m') has already sent the token Tk(m', n) to the node N(m) in response to the first token request sent at sub-step 403.

The node N(m) then repeats sub-step 406, by checking whether the timestamp Ts(m', n) comprised in the token Tk(m', n) received in response to the second token request sent at the first iteration of sub-step 410 is comprised in the current block period n.

If the outcome of this check is still negative (which case occurs if the content of the token Tk(m' n) still relates to the previous block period n−1), the node N(m) repeats sub-step 407, thereby delaying the query time Tq(m, n) by a request iteration period Td. The node N(m) then repeats the check of sub-step 408 and, in case of positive outcome, repeats sub-steps 409 and 410, thereby sending a new token request to the predecessor node N(m') and by further increasing the index k.

The loop formed by sub-steps 406 to 410 is preferably repeated (namely, the query time Tq(m, n) is delayed by a request iteration period Td and a new token request is transmitted to the predecessor node N(m')) until one of the following conditions occurs:

i) at sub-step 406 the node N(m) determines that the content of the retrieved token Tk(m', n) comprises information relating to the current block period n, which may be properly used for calculating the data loss over the link L(m', m) at the current block period n. In this case, the node N(m) uses the information comprised in the token Tk(m', n) for calculating the data loss on the link L(m', m), as it will be described in detail herein after; or ii) at sub-step 408, the node N(m) determines that the query time Tq(m, n) calculated at sub-step 408 is comprised in the subsequent block period n+1. In this case, the node N(m) abandons the attempt to retrieve the token Tk(m', n) from the predecessor node N(m') and continues its operation at step 50, as it will be described in detail herein after.

If, at sub-step 404, in response to the token request sent at sub-step 403, the node N(m) does not receive the token Tk(m', n) from the predecessor node N(m'), the node N(m) determines that the token mechanism has never been active at the predecessor node N(m'). Indeed, if the token mechanism had been active for at least one block period preceding the current one, the predecessor node N(m') would have generated a token which would be now available, although not updated with the information relating to the current block period n. In such case, the node N(m) then abandons the attempt to retrieve the token Tk(m', n) from the predecessor node N(m') and continues its operation at step 50, as it will be described in detail herein after.

By referring again to FIG. 5, after trying to retrieve the token Tk(m', n) from the predecessor node N(m'), the node N(m) preferably generates its own token Tk(m, n) (step 50).

Figure 8:
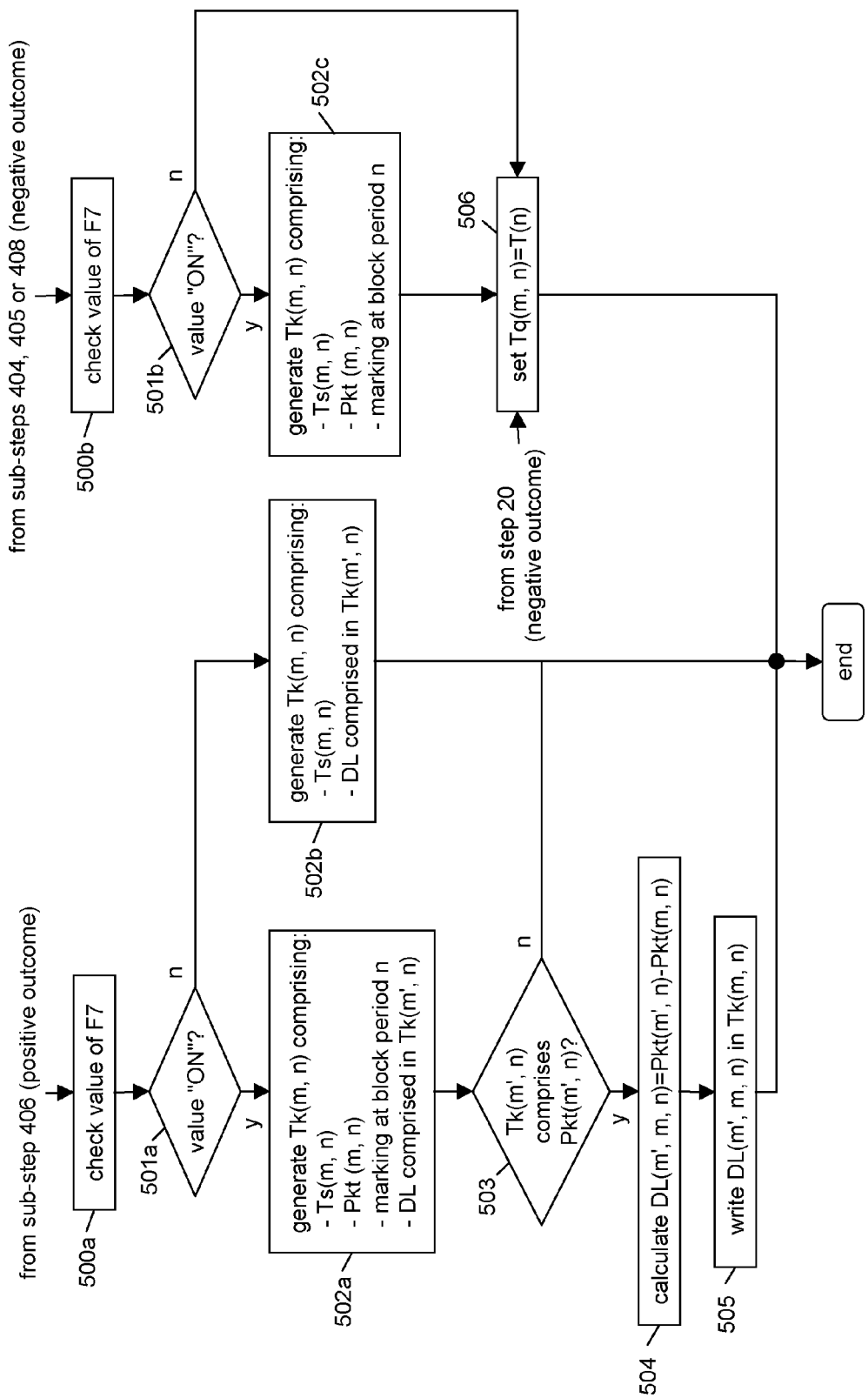
FIG. 8 is a more detailed flow chart of a still further step carried out by the node of FIG. 3.

Step 50 is shown in detail in FIG. 8.

In case the node N(m) succeeded to retrieve the token Tk(m', n) at step 40 and the token Tk(m', n) comprises information relating to the current block period n (positive outcome of sub-step 406), at sub-step 500a the node N(m) preferably reads in the table T the value of the seventh field F7 of the row relating to the current block period n, which (as described above) indicates whether the number of received packets Pkt(m, n) was successfully calculated at step 30. If, at sub-step 501a, the node N(m) determines that the value of the seventh field F7 indicates a positive outcome of the calculation, at sub-step 502a the node N(m) preferably generates a token Tk(m, n), which will be termed herein after "token of type 1". The token Tk(m, n) of type 1 generated by the node N(m) at sub-step 502a preferably comprises:

a timestamp Ts(m, n) indicating the time at which the token Tk(m, n) is generated by the node N(m);

the number of received packets Pkt(m, n) as calculated at step 30 by the node N(m) during the current block period n;

information indicative of the marking value Va, Vb applied to packets Pki during the current block period n; and possible value(s) of data loss comprised in the token Tk(m', n) retrieved from the predecessor node N(m'), relating to links located upstream the predecessor node N(m').

Then, at sub-step 503, the node N(m) preferably determines whether the token Tk(m', n) retrieved from the predecessor node N(m') comprises the number of received packets Pkt(m', n) as calculated by the predecessor node N(m') during the current block period n.

In the affirmative, since both the number of packets Pkt(m, n) received at the node N(m) and the number of packets Pkt(m', n) received at the predecessor node N(m') are available, the node N(m') determines that a calculation of the data loss over the link L(m', m) connecting the predecessor node N(m') to the node N(m) may be performed. Hence, at sub-step 504, the node N(m) preferably calculates the data loss DL(m', m, n) over the link L(m', m) according to the above equation [4], namely: DL(m', m, n)=Pkt(m', n)−Pkt(m, n).

At sub-step 504, the node N(m) may optionally calculate also a data loss ratio DLR(m', m, n) over the link L(m', m) by applying the following equation:

$$DLR(m',m,n)=[Pkt(m',n)-Pkt(m,n)]/Pkt(m',n) \quad [7]$$

Then, at sub-step 505, the node N(m) preferably inserts in the token Tk(m, n) of type 1 generated at sub-step 502a also the calculated data loss DL(m', m, n) and, optionally, the calculated data loss ratio DLR(m', m, n).

Hence, in this case, the token Tk(m, n) generated by the node N(m) comprises the number of received packets Pkt(m, n) (which allows the successor node(s) to calculate the data loss relating to the links connecting them to the node N(m)), the data loss DL(m', m, n) relating to the link L(m', m) and, possibly, also the data loss relating to the links upstream the predecessor node N(m'), provided that the predecessor node N(m') and the nodes upstream it were able to calculate them during the current block period n.

If, at sub-step 503, the node N(m) determines that the token Tk(m', n) retrieved from the predecessor node N(m') does not comprise the number of received packets Pkt(m', n), the node N(m) concludes that the data loss DL(m', m, n) relating to the link L(m', m) can not be calculated at the current block period n, and accordingly does not perform any other action.

In this case, the token Tk(m, n) generated by the node N(m) comprises the number of received packets Pkt(m, n) (which will allow the successor node(s) to calculate the data loss relating to the links connecting them to the node N(m)) and, possibly, the data loss relating to the links upstream the predecessor node N(m'), provided that the predecessor node N(m') and the nodes upstream it were able to calculate them during the current block period. The token Tk(m, n) however does not comprise the data loss DL(m', m, n) relating to the link L(m', m), because the node N(m) is not able to calculate it.

If, at sub-step 501a, the node N(m) determines that the value of the seventh field F7 indicates a negative outcome of the calculation of the number of received packets Pkt(m, n) at the current block period n (e.g. because packets Pki are received at the node N(m) through different interfaces at the current block period n and at the still previous block period n−2), at sub-step 502b the node N(m) preferably generates a token Tk(m, n), which will be termed herein after "token of type 2". The token Tk(m, n) of type 2 generated by the node N(m) at sub-step 502b preferably comprises:

the timestamp Ts(m, n) indicating the time at which the token Tk(m, n) is generated by the node N(m); and possible value(s) of data loss comprised in the token Tk(m', n) retrieved from the predecessor node N(m'), relating to links located upstream the predecessor node N(m').

Hence, in this case, the token Tk(m, n) substantially comprises only the data loss relating to the links upstream the predecessor node N(m'), provided that the predecessor node N(m') and the nodes upstream it were able to calculate them during the current block period. The token Tk(n, m) of type 2 however comprises neither the number of received packets Pkt(m, n) nor the data loss DL(m', m, n), because the node N(m) was not able to calculate them at the current block period n. Hence, the successor node(s) will not be able to calculate the data loss relating to the links connecting them to the node N(m). However, they will be nonetheless able to calculate the number of received packets at the current block period n and to forward the calculated values to their respective successor nodes, which will then be able to perform the data loss calculation. In other words, if a node is not capable of calculating the number of received packets at a given block period, this only affects the capability of its successor node(s) to calculate the data loss during that block period. However, this does not affect the capability of nodes located further downstream along the path of the packets Pki to calculate the data loss. Furthermore, the forwarding mechanism of the data loss calculated by the nodes located upstream the node unable to calculate the number of received packets is unaffected, since such values are included in the token of type 2.

In case the node N(m) did not succeed to retrieve the token Tk(m', n) at step 40 even when the pre-conditions of step 20 are fulfilled (negative outcome of sub-step 404, 405 or 408), at sub-step 500b the node N(m) preferably reads in the table T the value of the seventh field F7 of the row relating to the current block period n, which (as described above) indicates whether the number of received packets Pkt(m, n) was successfully calculated at step 30.

If, at sub-step 501b, the node N(m) determines that the value of the seventh field F7 indicates a positive outcome of the calculation, at sub-step 502c the node N(m) preferably generates a token Tk(m, n), which will be termed herein after "token of type 3". The token Tk(m, n) of type 3 generated by the node N(m) at sub-step 502c preferably comprises:
- the timestamp Ts(m) indicating the time at which the token Tk(m, n) is generated by the node N(m);
- the number of received packets Pkt(m, n) as calculated at step 30 by the node N(m) during the current block period n; and
- information indicative of the marking value Va, Vb applied to packets Pki during the current block period n.

Hence, in this case, the token Tk(m, n) generated by the node N(m) comprises the number of received packets Pkt(m, n) (which will allow the successor node(s) to calculate the data loss relating to the links connecting them to the node N(m)). However, the token Tk(m, n) does not comprise the data loss DL(m', m, n) relating to the link L(m', m) because, in the absence of the needed information which should have been provided by the predecessor node N(m'), the node N(m) is not able to calculate it. Further, no information on the data loss relating to the links upstream the predecessor node N(m') are available, because the predecessor node N(m') was not able to forward them.

Then, at sub-step 506 the node N(m) preferably sets the query time Tq(m, n) equal to the start time T(n) of the current block period. This basically resets any time shifting of the query time towards the end of the block period, which might have occurred during the preceding block periods. This way, at the next block period n+1, the query time will coincide with the start time of the block period and no adaptive offset will be applied.

If, at sub-step 501b, the node N(m) determines that the value of the seventh field F7 indicates a negative outcome of the calculation of the number of received packets Pkt(m, n) at the current block period n (e.g. because packets Pki are received at the node N(m) through different interfaces at the current block period n and at the still previous block period n−2), the node N(m) does not generate any token, because there is no information to be forwarded to the successor node(s). The node N(m) then merely performs sub-step 506. The same applies also when the pre-conditions of step 20 were not fulfilled.

If, at step 50, the node N(m) has generated a token Tk(m, n) of type 1, 2 or 3, the node N(m) stores it and, upon reception of a token request from a successor node, may send the generated token Tk(m, n) to the requesting successor node. Otherwise, no token with updated information relating to the current block period n is available at the node N(m). At the node N(m), anyway, during the current block period n the last generated token (which comprises not updated information) is available.

The above described steps 10-50 are preferably repeated by the node N(m) at each block period. Hence, at each block period, the node N(m) receives a token from the predecessor N(m') and generates a token, which is made available to the successor node(s). Preferably, at each block period, the token generated at the previous block period is overwritten by the token generated at the current block period. Indeed, the information comprised in the token generated at the previous block period is not needed at the current block period. This advantageously minimizes the amount of storage resources needed at the node N(m) for implementing the token mechanism. Alternatively, the token generated at the current block period may be stored in addition to the tokens generated at a predefined number of previous block periods.

Herein after, with reference to FIG. 10, the structure of the token Tk(m, n) generated by the node N(m) at step 50 will be described in further detail.

The token Tk(m, n) preferably comprises:
- label LB which preferably comprises a identifier of the node N(m) which generated the token Tk(m, n). The label LB is optional and may be comprised in tokens of type 1, 2, or 3;
- node identifier Id-N(m), namely identifier (preferably, hostname) of the node N(m) which generated the token Tk(m, n). The node identifier Id-N(m) is preferably comprised in tokens of type 1, 2, or 3;
- input interface identifier Id-IF, namely identifier of the input interface through which the packets Pki are received at the node N(m) which generated the token Tk(m, n). The input interface identifier Id-IF is preferably comprised in tokens of type 1, 2, or 3;
- timestamp Ts(m, n) which, as mentioned above, indicates the time at which the node N(m) generated the token Tk(m, n). The timestamp Ts(m, n) is used by the successor node(s) for determining whether the token Tk(m, n) comprises information relating to the current block period (see sub-steps 405-406 described above). The timestamp Ts(m, n) may depend e.g. on the query time of the last token request sent by the node N(m) at step 40, a processing time need at the node N(m) for processing the content of the received token Tk(m', n), the propagation time of the token request on the link L(m', m) from the node N(m) to the predecessor node N(m'), and the propagation time of the token Tk(m', n) on the link L(m', m) from the predecessor node N(m') to the node N(m).
- flow identifier Id-F, namely an identifier of the flow of packets Pki to which the information comprised in the token Tk(m, n) relate. In case of multicast distribution, the flow identifier Id-F preferably comprises the identifier of the multicast group associated to the packets Pki. The flow identifier Id-F is preferably comprised in tokens of type 1, 2, or 3;
- number of received packets Pkt(m, n) calculated by the node N(m) at the current block period n. The number of received packets Pkt(m, n) is preferably comprised in tokens of type 1 and 3 (not in tokens of type 2);
- number of received bytes B(m, n) calculated by the node N(m) at the current block period n. The number of received bytes B(m, n) may be derived from the number of received packets Pkt(m, n), provided the length of the packets Pki is known. The number of received bytes B(m, n) is preferably comprised in tokens of type 1 and 3 (not in tokens of type 2);

marking value MRK applied to the packets Pki during the current block period n. The marking value MRK is preferably comprised in tokens of type 1 and 3 (not in tokens of type 2);

information InfoDL(1), InfoDL(2), . . . InfoDL(m') relating to data loss over the first, second . . . last link of the path followed by the packets Pki, as read from the token Tk(m', n) provided by the predecessor node N(m'). Each information InfoDL(1), InfoDL(2), . . . InfoDL(m') preferably comprise: data loss over the link, byte loss over the link (optional), data loss ratio over the link (optional), identifier of the node which performed the calculations and identifier of the input interface through which the packets Pki are received at such node. The information InfoDL(1), InfoDL(2), . . . InfoDL(m') are preferably comprised in tokens of type 1 and 2 (not in tokens of type 3);

information InfoDL(m) relating to data loss upon the link L(m', m) between the node N(m) and the predecessor node N(m'), as calculated by the node N(m). Such information preferably comprise: data loss DL(m', m, n) over the link L(m', m) and, optionally, byte loss over the link L(m', m) and data loss ratio DLR(m', m, n) over the link L(m', m). The information InfoDL(m) are preferably comprised in tokens of type 1, provided the node N(m) was able to calculate DL(m', m, n) (positive outcome of sub-step 503);

other information (e.g. for debugging purpose during the testing phase).

The token Tk(m, n) may be inserted in a management message formatted according to a known protocol, such as for instance SNMP (Simple Network Management Protocol), Telnet or FTP (File Transfer Protocol) or TFTP (Trivial File Transfer Protocol). For instance, the token Tk(m, n) may be formatted as a set SNMP message. In case the token changeover mechanism is a backward mechanism (namely, each node "pulls" the token from the predecessor node, as described in detail above with reference to FIG. 7), the token request may be formatted as a get SNMP message.

In summary, the above described data loss calculation method has a number of advantages, namely: reduced implementation costs, self-adaptability to changes of network topology and/or path followed by packets, easiness of performance monitoring operations and failure detection and management operations.

In addition or as alternative to the data loss calculation, the above method may be advantageously applied also for performing other types of measurements on the flow of packets Pki. In particular, it may be advantageously applied for performing time measurements, for instance delay measurements and/or jitter measurements.

To this purpose, the packets Pki are preferably marked as described above. The node N(m) preferably implements the counters Ca(m), Cb(m) which are increased upon reception of each packet Pki according to the marking value Va, Vb of the packet, as described above. Each counter Ca(m), Cb(m) has associated a respective reception timestamp Trxa(m), Trxb(m). At each block period, upon reception of a predetermined packet Pki (for instance, the first packet of each block period), the node N(m) preferably sets the timestamp Trxa(m) (if the packet is marked by the first value Va) or the timestamp Trxb(m) (if the packet is marked by the second value Vb) equal to the current time.

Then, at each block period, the node N(m) preferably determines which counter Ca(m), Cb(m) is currently having constant value, and sets a measurement timestamp Trx(m, n) equal to the reception timestamp Trxa(m), Trxb(m) associated to that counter.

If the node N(m) may learn the measurement timestamp Trx(m', n) generated by the predecessor node N(m') at the current block period n, the node N(m) may calculate a delay D(m', m, n) of the predetermined packet Pki over the link L(m', m) as:

$$D(m',m,n)=Trx(m,n)-Trx(m',n) \qquad [8]$$

If the node N(m) may also learn the measurement timestamp Trx(m', n−1) generated by the predecessor node N(m') at the previous block period n−1, the node N(m) may calculate a jitter J(m', m, n) of the packets Pki as:

$$J(m',m,n)=[Trx(m,n)-Trx(m',n)]-[Trx(m,n-1)-Trx(m',n-1)] \qquad [9]$$

The above equations may be applied provided that the node N(m) and the predecessor node N(m') have synchronized clocks.

At each block period, the node N(m) may then generate a token Tk(n, m) which comprises (possibly in addition to the above described information relating to the data loss calculation) also information relating to time measurements, namely the measurement timestamp and the calculated delay and/or jitter. This allows propagating the time measurement performed by each node along the path of the packets Pki, similarly to the above described data loss measurements.

The advantages achieved by such method of performing time measurements are basically the same as the data loss calculation method, namely: reduced implementation costs, self-adaptability to changes of network topology and/or path followed by packets, easiness of performance monitoring operations and failure detection and management operations.

The invention claimed is:

1. A method for performing a measurement on a data flow at a node of a communication network, the data flow being transmitted by a source node along a transmission path including the node, the data flow including data units, each data unit comprising a payload and a header, the header comprising a marking field which is set by said source node to any of two marking values, the source node setting the marking field of the header of data units transmitted during first block periods to a first marking value and the source node setting the marking field of the header of data units transmitted during second block periods to a second marking value, the first block periods alternating in time with the second block periods, the method comprising, at the node, during a current block period:

a) determining a first parameter relating to reception of a plurality of data units for measurement of the data flow at the node during a preceding block period;

b) receiving from another node of the transmission path a first data structure other than said data units and including a second parameter relating to transmission of the plurality of data units to the node during the preceding block period, the first data structure being for transmission of parameters;

c) processing the first parameter and the second parameter for providing a result of the measurement on the data flow; and d) transmitting to a further node of the transmission path a second data structure other than said data units, said second data structure being for transmission of parameters and including the first parameter and the result of the measurement on the data flow.

2. The method according to claim 1, wherein the first data structure further comprises a result of the measurement on the data flow as calculated by the other node.

3. The method according to claim 2, wherein d) further comprises inserting in the second data structure also the result of the measurement on the data flow as calculated by the other node.

4. The method according to claim 1, wherein:
the first parameter indicates a first number of data units received at the node during the preceding block period;
the second parameter indicates a second number of data units transmitted to the node during the preceding block period; and
the result of the measurement on the data flow indicates a third number of data units lost in transmission from the other node to the node during the preceding block period.

5. The method according to claim 4, wherein the method further comprises, at the node, during the second block periods, e) increasing a first counter upon reception of each data unit marked by the second marking value, and a) further comprises determining the first parameter by processing the counter.

6. The method according to claim 5, wherein:
a) further comprises determining the first parameter as a difference between a first data unit count and a second data unit count, the first data unit count being equal to a first value reached by the first counter during the current block period and the second data unit count being equal to a second value reached by the first counter during a still preceding block period; and
c) further comprises providing the result of the measurement on the data flow as a difference between the second parameter and the first parameter.

7. The method according to claim 6, wherein a) comprises:
checking whether the data flow is received at the node through a same input interface during the current block period and during the still preceding block period;
determining that the first data unit count may not be determined when the data flow is received through the same input interface and during the current block period and the still preceding block period;
setting the first data unit count equal to the first value reached by the first counter during the current block period and checking whether the second data unit count is available when the data flow is not received through the same input interface and during the current block period and the still preceding block period;
determining the first parameter as a difference between the first data unit count and the second data unit count when the second data unit count is available; and
determining that the first parameter may not be determined when the second data unit count is not available.

8. The method according to claim 1, wherein b) further comprises, at a query time in the current block period, transmitting to the other node a request for receiving the first data structure.

9. The method according to claim 8, wherein b) further comprises setting the query time equal to a preceding query time determined during the preceding block period delayed by a duration of the block periods.

10. The method according to claim 9, wherein b) further comprises bringing backward the query time by a predefined offset.

11. The method according to claim 8, wherein the method further comprises:
at b), checking whether the first data structure is received from the other node in reply to the request;
determining that the result of the measurement on the data flow may not be provided when the first data structure is not received from the other node in reply to the request;
at b), checking whether the first data structure includes the second parameter relating to data units transmitted to the node during the preceding block period when the first data structure is received from the other node in reply to the request;
using the first parameter for providing the result of the measurement on the data flow when the first data structure includes the second parameter; and
at b), re-transmitting the request to the node when the first data structure does not include the second parameter.

12. The method according to claim 1, wherein the second data structure is stored at the node.

13. The method according to claim 1, wherein a content of the second data structure is overwritten at each block period if a new second data structure is generated.

14. A node for a communication network, the node configured to be in a transmission path along which a data flow is transmitted by a source through the communication network, the data flow including data units, each data unit comprising a payload and a header, the header comprising a marking field which is set by the source node to any of two marking values, the source node setting the marking field of the header of data units transmitted during first block periods to a first marking value and the source node setting the marking field of the header of data units transmitted during second block periods to a second marking value, the first block periods alternating in time with the second block periods, the node comprising:
circuitry including a memory that stores computer-readable instructions that when executed by the circuitry cause the circuitry to be configured to
a) determine a first parameter relating to reception of a plurality of data units for measurement of the data flow at the node during a preceding block period;
b) receive from another node of the transmission path a first data structure other that said data units and including a second parameter relating to transmission of the plurality of data units to the node during the preceding block period, the first data structure being for transmission of parameters;
c) process the first parameter and the second parameter for providing a result of the measurement on the data flow; and
d) transmit to a further node of the transmission path a second data structure other than said data units, said second data structure being for transmission of parameters and including the first parameter and the result of the measurement on the data flow.

15. A communication network comprising a node according to claim 14.

16. A non-transitory computer-readable medium encoded with computer-readable instructions that, when executed by a computer, cause the computer to perform a method according to claim 1.

* * * * *